(12) United States Patent
Xie et al.

(10) Patent No.: US 11,610,574 B2
(45) Date of Patent: Mar. 21, 2023

(54) SOUND PROCESSING APPARATUS, SYSTEM, AND METHOD

(71) Applicant: Robert Bosch GmbH, Stuttgart (DE)

(72) Inventors: Hui Xie, Shanghai (CN); Wei Wang, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 73 days.

(21) Appl. No.: 17/234,086

(22) Filed: Apr. 19, 2021

(65) Prior Publication Data

US 2021/0327402 A1 Oct. 21, 2021

(30) Foreign Application Priority Data

Apr. 20, 2020 (CN) .......................... 202010312407.3

(51) Int. Cl.
*G10K 11/178* (2006.01)
*G06N 5/04* (2006.01)
*G06N 20/00* (2019.01)
*G10L 25/51* (2013.01)

(52) U.S. Cl.
CPC ......... *G10K 11/17827* (2018.01); *G06N 5/04* (2013.01); *G06N 20/00* (2019.01); *G10K 11/17823* (2018.01); *G10K 11/17854* (2018.01); *G10K 11/17873* (2018.01); *G10K 11/17885* (2018.01); *G10L 25/51* (2013.01); *G10K 2210/1081* (2013.01); *G10K 2210/3027* (2013.01); *G10K 2210/3028* (2013.01); *G10K 2210/30351* (2013.01); *H04R 2225/41* (2013.01)

(58) Field of Classification Search
CPC ....... G10K 11/17827; G10K 11/17823; G10K 11/17873; G10K 11/17885; G10K 11/17854; G10K 2210/1081; G10K 2210/3027; G10K 2210/3028; G10K 2210/30351; G06N 20/00; G06N 5/04; G10L 25/51; H04R 2225/41
USPC ...................................................... 381/71.11
See application file for complete search history.

(56) References Cited

U.S. PATENT DOCUMENTS 9,886,954 B1 * 2/2018 Meacham ............... G10L 25/84

* cited by examiner

*Primary Examiner* — Paul Kim
*Assistant Examiner* — Douglas J Suthers
(74) *Attorney, Agent, or Firm* — Maginot, Moore & Beck LLP

(57) ABSTRACT

A sound processing apparatus includes a receiving module configured to receive audio signals of one or more sounds acquired by a personal sound device, a processing module configured to use a sound processing model to perform: classification processing in which a type of a scenario where a user of the personal sound device is located is determined based on the audio signals; identification processing in which each of the one or more sounds is determined as a desired sound or an undesired sound based on the determined type of the scenario, and filtering processing in which filtering configuration is performed based on a result of the identification processing. The audio signals are filtered based on the filtering configuration, and an output module is configured to output the filtered audio signals, so as to provide same to the user.

17 Claims, 5 Drawing Sheets

SOUND PROCESSING APPARATUS, SYSTEM, AND METHOD

This application claims priority under 35 U.S.C. § 119 to patent application no. CN 20 2010 312 407.3, filed on Apr. 20, 2020 in China, the disclosure of which is incorporated herein by reference in its entirety.

The disclosure generally relates to sound processing based on artificial intelligence. In particular, the disclosure relates to a sound processing apparatus for a personal sound device, and further relates to a system comprising the sound processing apparatus, and to a sound processing method.

BACKGROUND

In recent years, noise reduction headphones have become popular because they can create a comfortable use scenario for wearers. For example, when a user puts on the headphones and activates a noise reduction button, the user can enjoy his/her favorite music in a quiet environment; and the user can focus on his/her work in office or travel scenarios without being disturbed by ambient noise.

Noise reduction solutions applied to headphones in the prior art mainly comprise passive noise reduction solutions and active noise reduction solutions. The passive noise reduction solutions isolate sounds by using a passive noise reduction (PNR) technology based on sound absorbing and/or reflective materials. The active noise reduction solutions use an active noise reduction (ANR) technology based on an anti-noise sound output to neutralize noise, so as to achieve the effect of noise reduction.

However, whether it is passive noise reduction or active noise reduction, all noise will be filtered out, which may cause danger. For example, although noise reduction headphones effectively filter out noisy sounds on the subway, some desired sounds, such as station broadcasts and baby crying, are also filtered out.

Therefore, it is desired to propose a technical solution to solve the above problems in the prior art.

SUMMARY

In view of the above problems in the prior art, the disclosure aims to provide an intelligent sound processing solution for a personal sound device, which can automatically reduce noise based on user needs.

To this end, according to an aspect of the disclosure, a sound processing apparatus used in a personal sound device is provided, the sound processing apparatus comprising: a receiving module configured to receive audio signals of one or more sounds acquired by the personal sound device, wherein the one or more sounds comprise at least ambient sounds around the personal sound device; a processing module configured to use a sound processing model to perform: classification processing in which a type of a scenario where a user of the personal sound device is located is determined based on the audio signals; identification processing in which each of the one or more sounds is identified as a desired sound or an undesired sound based on the determined type of the scenario; and filtering processing in which filtering configuration is performed based on a result of the identification processing, and the audio signals are filtered based on the filtering configuration, so that undesired sounds in the one or more sounds are at least partially filtered out, and desired sounds in the one or more sounds are let through; and an output module configured to output the filtered audio signals, so as to provide same to the user.

According to a feasible implementation, the sound processing model comprises one or more machine learning-based models.

According to a feasible implementation, the sound processing model comprises a first trained machine learning model, a second trained machine learning model, and a third trained machine learning model; and the processing module is configured to: use the first trained machine learning model to perform the classification processing on the audio signals, to output the type of the scenario; use the second trained machine learning model to perform the identification processing based on the output of the first trained machine learning model, to output each of the one or more sounds as a desired sound or an undesired sound; and use the third trained machine learning model to perform the filtering processing based on the output of the second trained machine learning model, to output the filtered audio signals.

According to a feasible implementation, the first trained machine learning model, the second trained machine learning model, and the third trained machine learning model are combined into one or more hybrid machine learning models.

According to a feasible implementation, the processing module determines each sound as a desired sound or an undesired sound through at least one of the following items of processing: cepstrum analysis, voiceprint recognition, and keyword and/or key sound detection.

According to a feasible implementation, each item of the above processing is performed by the processing module using a model related thereto.

According to a feasible implementation, the sound processing apparatus further comprises a communication module configured to be communicatively connected to an external electronic device located outside the personal sound device, so as to exchange information with an audio application arranged in the external electronic device.

According to a feasible implementation, the communication module receives an instruction from the audio application, and the instruction comprises the user's intention to filter sounds in the determined type of the scenario; and the processing module adjusts the filtering configuration according to the instruction.

According to a feasible implementation, the communication module is configured to: transmit an audio signal of a new sound captured by the personal sound device during use to the audio application; and receive a processing parameter, of the audio signal, based on the new sound from the audio application, so that the new sound can be identified.

According to a feasible implementation, the communication module is further configured to receive recommended audio content from the audio application, wherein the recommended audio content is based on the determined type of the scenario and a use state of the personal sound device.

According to a feasible implementation, all or some modules of the sound processing apparatus are implemented by means of one or more AI chips.

According to another aspect of the disclosure, a computing device is provided, wherein the computing device is arranged in a remote server and creates a sound processing model for processing audio signals of one or more sounds acquired during use of a personal sound device, and the creating of the sound processing model comprises: performing a first creation process in which the sound processing model can determine, based on the audio signals, a type of a scenario where a user of the personal sound device is located; performing a second creation process in which the sound processing model can determine each of the one or more sounds as a desired sound or an undesired sound based on the determined type of the scenario; and performing a third creation process in which the sound processing model can perform filtering configuration and perform filtering based on the filtering configuration on the audio signals, so that undesired sounds in the one or more sounds are at least partially filtered out, and desired sounds in the one or more sounds are let through.

According to a feasible implementation, the creating of the sound processing model comprises training one or more machine learning-based models in the first to third creation processes.

According to a feasible implementation, the creating of the sound processing model comprises: performing first training on a machine learning-based model to obtain a first trained machine learning model, and using the audio signals as an input in the first training process to generate an output representing the type of the scenario; performing second training on a machine learning-based model to obtain a second trained machine learning model, and using an output of the first trained machine learning model as an input in the second training process to generate an output representing that each of the one or more sounds is a desired sound or an undesired sound; and performing third training on a machine learning-based model to obtain a third trained machine learning model, and using an output of the second trained machine learning model as an input in the third training process to output the filtered audio signals.

According to a feasible implementation, the first trained machine learning model, the second trained machine learning model, and the third trained machine learning model are combined into one or more hybrid machine learning models.

According to a feasible implementation, the computing device is further configured to perform a relearning process on the sound processing model based on an audio signal of a new sound captured by the personal sound device during use, such that the sound processing model can identify the new sound as a desired sound or an undesired sound, and generate a processing parameter for enabling the sound processing model to identify the new sound.

According to a feasible implementation, the computing device is further configured to retrain the second trained machine learning model, and use, in the retraining process, the audio signal of the new sound captured by the personal sound device during use as an input, to generate an output representing that the new sound is a desired sound or an undesired sound; and generate, in the retraining process, a processing parameter for enabling the second trained machine learning model to identify the new sound.

According to still another aspect of the disclosure, a sound processing system is provided, comprising: the above sound processing apparatus arranged in a personal sound device; the above computing device arranged in a remote server and creating a sound processing model for processing audio signals of one or more sounds acquired at the personal sound device; and an audio application arranged in an external electronic device outside the personal sound device, wherein the audio application is separately communicatively connected to the computing device and the sound processing apparatus, wherein the sound processing apparatus uses the sound processing model created in the remote server to comprehensively process the audio signals of the one or more sounds acquired by the personal sound device to generate a filtered audio signal, so that undesired sounds in the one or more sounds are at least partially filtered out, and desired sounds in the one or more sounds are let through.

According to yet another aspect of the disclosure, a sound processing method is provided, wherein optionally, the method is performed by the above sound processing apparatus and/or the above sound processing system, and the method comprises: receiving audio signals of one or more sounds acquired by a personal sound device, wherein the one or more sounds comprise at least ambient sounds around the personal sound device; using a sound processing model to perform classification processing in which a type of a scenario where a user of the personal sound device is located is determined based on the audio signals; using the sound processing model to perform identification processing in which each of the one or more sounds is determined as a desired sound or an undesired sound based on the determined type of the scenario; using the sound processing model to perform filtering processing in which filtering configuration is performed based on a result of the identification processing, and the audio signals are filtered based on the filtering configuration, so that undesired sounds in the one or more sounds are at least partially filtered out, and desired sounds in the one or more sounds are let through; and outputting the filtered audio signals, so as to provide same to the user.

According to still yet another aspect of the disclosure, a sound processing apparatus used in a personal sound device is provided, the sound processing apparatus comprising: one or more processors; and a memory storing computer-executable instructions that, when executed, cause the one or more processors to perform the above method.

According to a further aspect of the disclosure, a computer-readable storage medium is provided, having stored thereon instructions that, when executed by at least one processor, cause the at least one processor to perform the above method.

It can be seen that, according to the technical solution of the disclosure, the machine learning model can be used to automatically process sounds received by the personal sound device, so that a user can hear the sounds matching a scenario type and his/her own intention. Moreover, according to the technical solution of the disclosure, the intelligence and automation level of sound processing can be continuously improved and expanded through customizing combined solutions of sound filtering and letting through for different scenario types and different users.

DETAILED DESCRIPTION

The disclosure mainly relates to a technical solution for automatically processing a sound signal acquired by a personal sound device. Specifically, a sound processing solution according to the disclosure may be implemented based on an artificial intelligence (AI) technology.

In the disclosure, "the personal sound device" means a device that is configured to be positioned in at least one ear of a user, above the ear, or around the ear, such as a headset, earbuds, and hook earbuds.

Embodiments of the disclosure are described in detail below in conjunction with the accompanying drawings.

Figure 1:
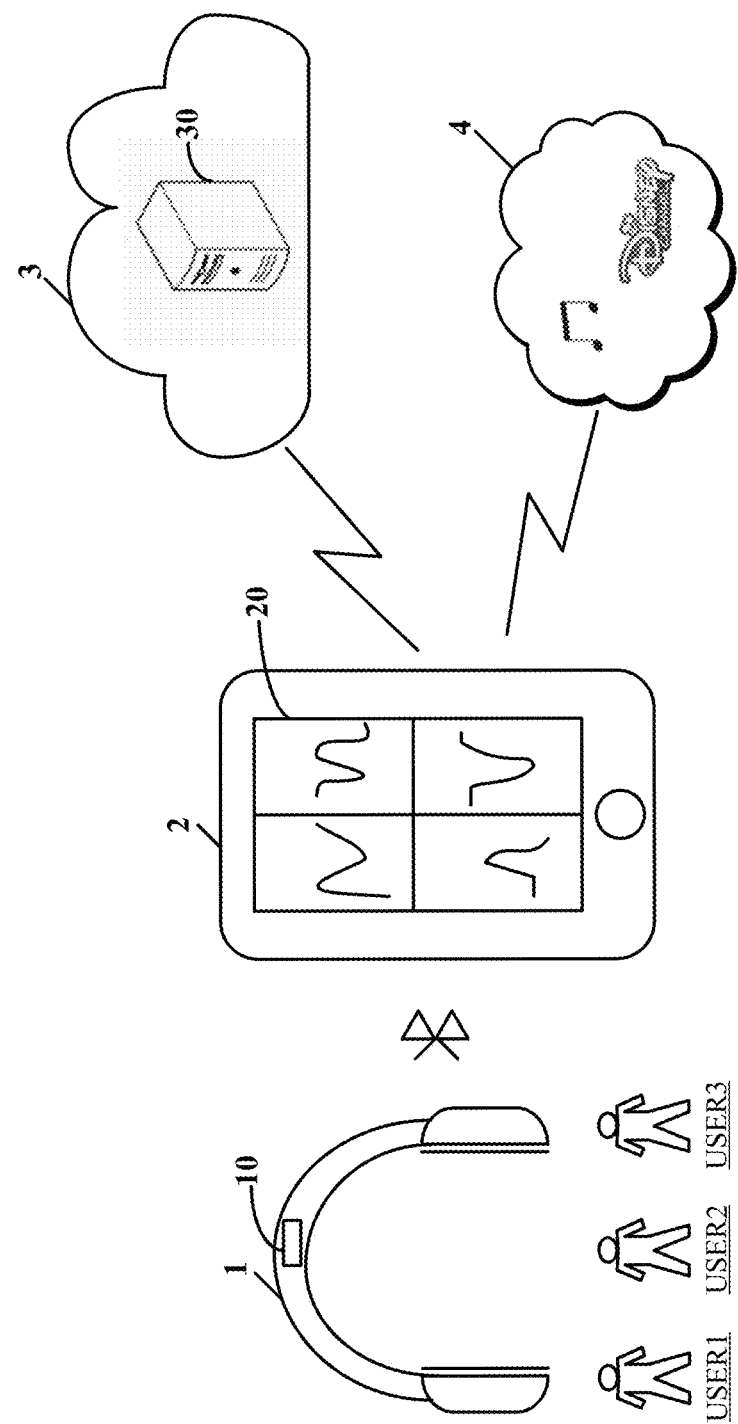
FIG. 1 shows an exemplary operating environment in which some implementations of the disclosure may be implemented.
Figure 2:
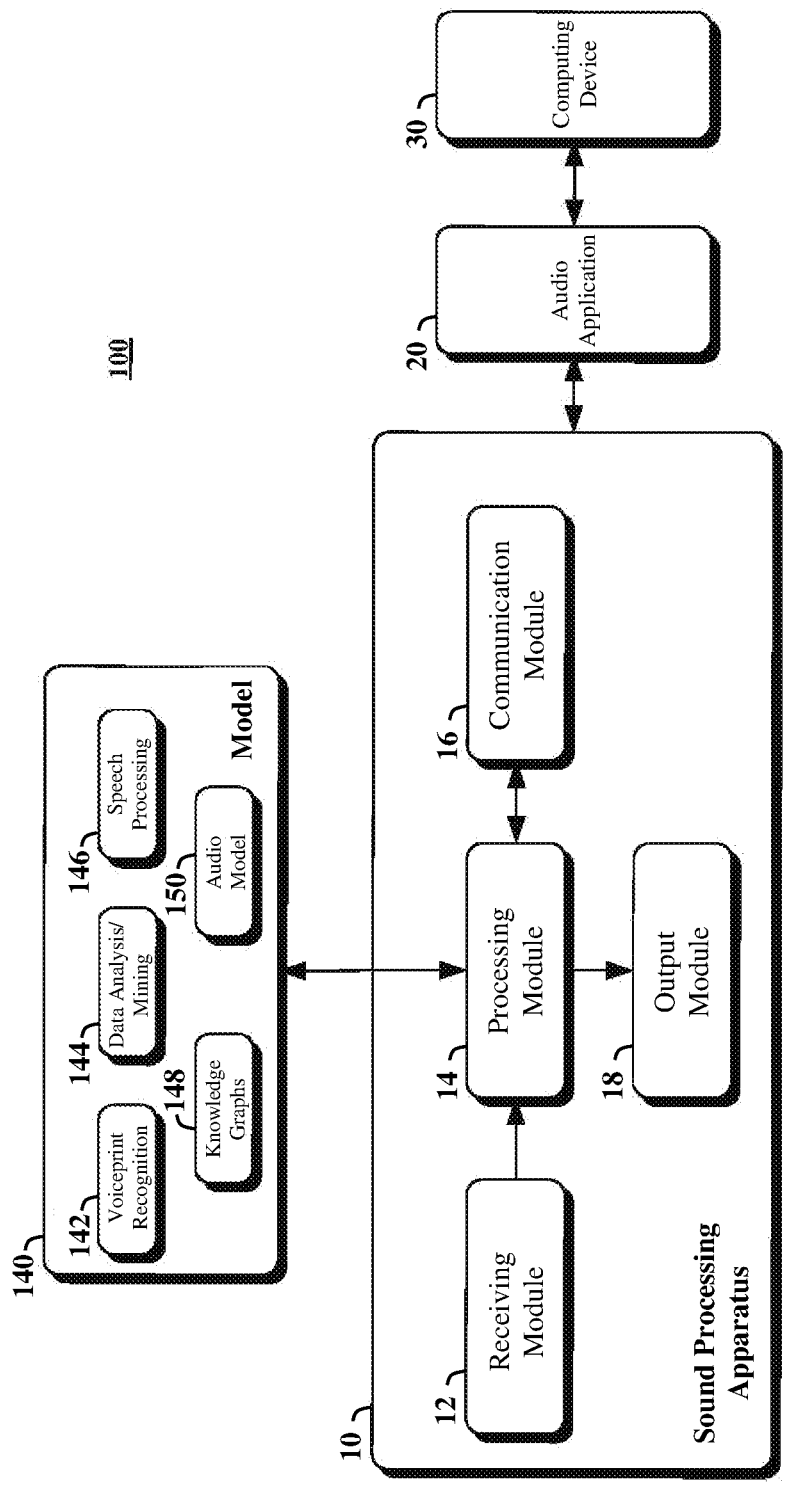
FIG. 2 is a schematic block diagram of a sound processing system according to a feasible implementation of the disclosure, the sound processing system comprising a sound processing apparatus used in a personal sound device according to the disclosure.

FIG. 1 shows an exemplary operating environment in which some implementations of the disclosure may be implemented. FIG. 2 schematically shows a sound processing system 100 according to a feasible implementation of the disclosure. The sound processing system 100 illustrated in FIG. 2 may be implemented in the operating environment of FIG. 1. It should be noted that the sound processing system 100 according to the disclosure is not limited to a framework shown in FIG. 1.

Referring to FIG. 1 and FIG. 2, the sound processing system 100 mainly comprises a sound processing apparatus 10, an audio application 20, and a computing device 30.

The sound processing apparatus 10 is arranged in a personal sound device 1, and the personal sound device 1 is, for example, headphones. The personal sound device 1 may be used by a plurality of users, such as USER1 to USER3 shown in FIG. 1. When using the personal sound device 1 provided with the sound processing apparatus 10, different users can activate customized modes suitable for them, which will be described in detail below.

The sound processing apparatus 10 may be arranged in a processing unit of the personal sound device 1. The processing unit may comprise any type of general-purpose processing unit (including but not limited to a CPU, a GPU, etc.) and dedicated processing unit (including but not limited to an application specific integrated circuit (ASIC), a programmable logic device (PLD), a digital signal processor (DSP), a field programmable gate array (FPGA), etc.).

The sound processing apparatus 10 mainly comprises a receiving module 12, a processing module 14, a communication module 16, and an output module 18. In an embodiment, the sound processing apparatus 10 may be implemented by using an artificial intelligence technology, that is, all or some modules of the sound processing apparatus 10 may be implemented by means of one or more AI chips. For example, some of the functional modules of the sound processing apparatus 10 are arranged on one AI chip, and some other functional modules are arranged on another AI chip.

It can be understood that the name of each module of the sound processing apparatus 10 should be understood as a logical description instead of a limitation on a physical form or an arrangement manner. In other words, one or more of the receiving module 12, the processing module 14, the communication module 16, and the output module 18 can be implemented in the same chip or circuit, or can be respectively arranged in different chips or circuits, which is not limited in the disclosure. For each module of the sound processing apparatus 10, once the sound processing apparatus 10 has the function of a module, it should be understood that the sound processing apparatus 10 comprises the module.

The processing module 14 may use a sound processing model 140 to perform sound processing. The sound processing model 140 is pre-created at a remote server 3 (such as the computing device 30). The sound processing model 140 may comprise a plurality of sub-models. The sound processing model 140 may comprise one or more machine learning-based models.

In an embodiment, the sound processing model 140 is implemented as a machine learning-based model, and the machine learning-based model is pre-trained at the remote server 3 (such as the computing device 30) and further has the capability (function) of relearning. The trained machine learning model 140 may comprise one or more hybrid machine learning models. For example, the trained machine learning model 140 may comprise a voiceprint recognition model 142, a data analysis/mining model 144, a speech processing model 146, an audio knowledge graph 148, a model 150 related to processing of audio streams (such as a speech rate statistical model, a keyword detection model, and a feature sound detection model), etc.

The sound processing apparatus 10 may be turned on when the personal sound device 1 is powered on (for example, a power button of the headphone is in an ON state), that is, its sound processing function is activated when the personal sound device 1 is powered on. The sound processing apparatus 10 may be turned off when the personal sound device 1 is powered off (the power button of the headphone is in an OFF state).

The audio application 20 is arranged in an external electronic device 2 located outside the personal sound device 1. The external electronic device 2 is, for example, a smart phone, a desktop computer, a tablet computer, and a multimedia player. The external electronic device 2 and the personal sound device 1 may be communicatively connected to each other in a wired and/or wireless manner, so that the sound processing apparatus 10 and the audio application 20 can exchange data. For example, the external electronic device 2 and the personal sound device 1 can transmit data by using a USB cable. The external electronic device 2 and the personal sound device 1 can also transmit data over a network, and the network includes but is not limited to a wireless local area network (WLAN), an infrared (IR) network, a Bluetooth network, a near field communication (NFC) network, a ZigBee network, etc.

The computing device 30 is arranged in the remote server 3. The remote server 3 may be communicatively coupled with the external electronic device 2 to enable data exchange between the audio application 20 and the computing device 30. The remote server 3 can be communicatively connected to the external electronic device 2 over a network, and the network may be based on any radio communication technology and/or standard. For example, the network may comprise any standard of telecommunication network provided by a telecommunications operator. The network may further comprise the Internet of Things (IoT). In an implementation, the remote server 3 may be deployed in a distributed computing environment, and may be implemented using a cloud computing technology. The disclosure is not limited thereto.

It can be understood that the data exchange between the personal sound device 1 and the remote server 3 is performed by means of the external electronic device 2. For example, in the relearning process described below, the sound processing apparatus 10 transmits audio signals of new sounds (such as sounds that are collected during the use of the personal sound device 1 by different users and not recognized by the sound processing apparatus 10) to the audio application 20, and then the audio application 20 uploads, to the remote server 3, the audio signals of the new sounds having labels.

Figure 3:
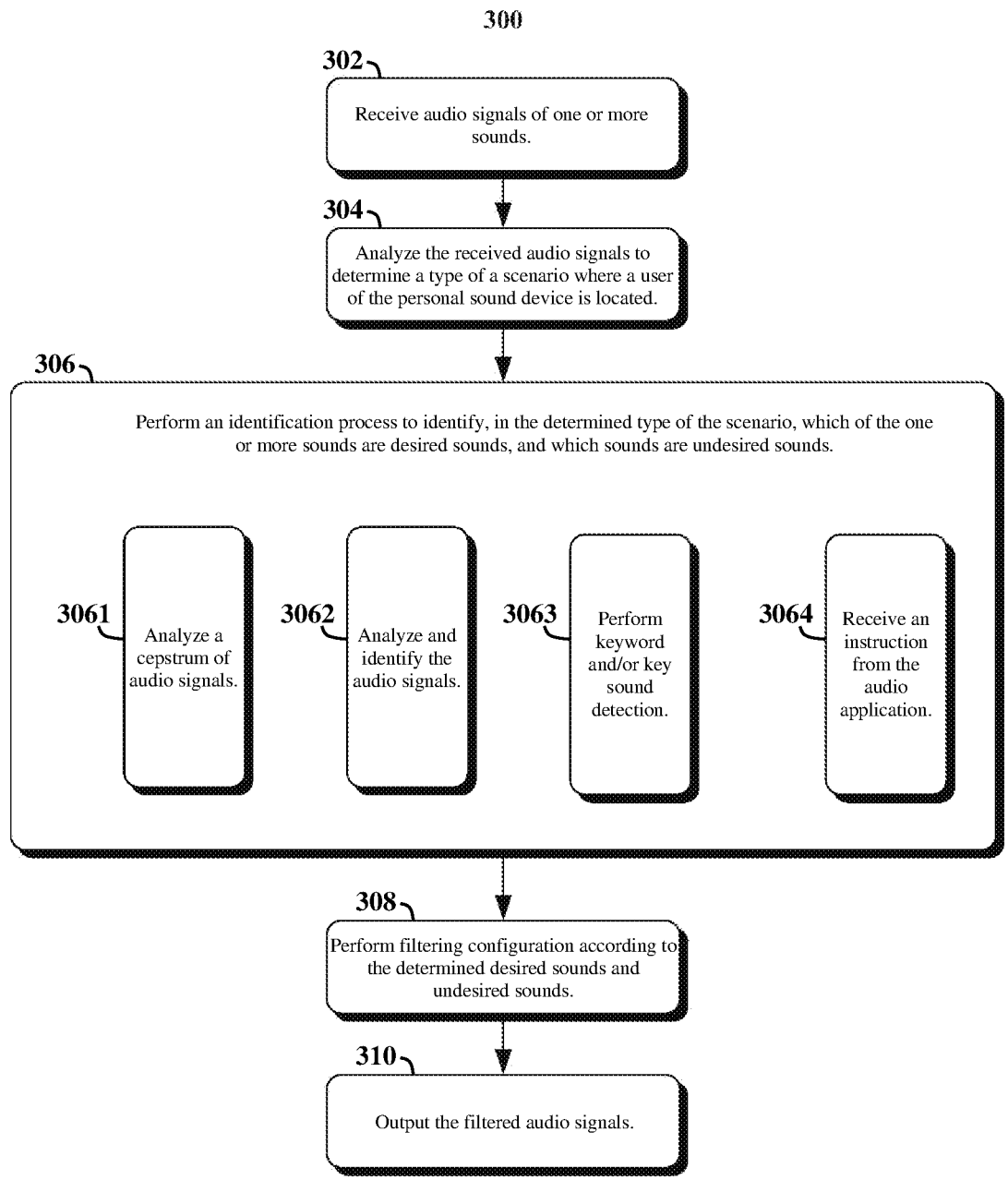
FIG. 3 shows an exemplary process of sound processing according to a feasible implementation of the disclosure.

FIG. 3 shows an exemplary process 300 of sound processing according to a feasible implementation of the disclosure. The following takes the execution of the process 300 by the sound processing apparatus 10 as an example for description.

In block 302, the receiving module 12 receives audio signals of one or more sounds. The one or more sounds may comprise surrounding ambient sounds captured (collected) by a microphone of the personal sound device 1. The one or more sounds may also comprise sounds from the external electronic device 2, for example, a speech event such as a call, and an audio input event such as playing music or a video.

In block 304, the processing module 14 analyzes the received audio signals to determine a type of a scenario where a user of the personal sound device 1 is located. For example, the processing module 14 uses the sound processing model 140 to perform classification processing in which the type of the scenario where the user of the personal sound device is located is determined based on the received audio signals. The part of the sound processing model 140 for performing the classification processing may be implemented by the computing device 30 through a first creation process. For example, sub-models of the sound processing model 140 for the classification processing are implemented in the first creation process.

Scenario types may include office, home, public transport, etc. In an embodiment, the processing module 14 may further determine subtypes under the scenario type (i.e., small types under the large type). For example, public transport scenario types may include subways, trains, airplanes, etc. Office scenario types may comprise small types divided based on work tasks and/or organizational structures, such as project team 1, project team 2, a personnel department, and a research and development department.

In an embodiment, the processing module 14 may use a first trained machine learning model to output the type of the scenario. The first trained machine learning model is, for example, a model suitable for classification. The first trained machine learning model is obtained by performing first training on a machine learning-based model on the computing device 30. In the first training process, audio signals of various types of sounds are used as model inputs, and scenario types are generated as model outputs. In the first training process, training can be performed first based on classification of large types, and then training can be performed based on small types under each large type. In the training process based on the small types, audio signals of sounds of various small types are used as model outputs, and model outputs representing the small types are generated.

In block 306, the processing module 14 performs an identification process to identify, in the determined type of the scenario, which of the one or more sounds are desired sounds (i.e., the sounds that the user of the personal sound device 1 desires to hear in this scenario type), and which sounds are undesired sounds (i.e., the sounds that the user of the personal sound device 1 does not desire to hear in this scenario type). For example, the processing module 14 uses the sound processing model 140 to perform identification processing in which each of the one or more sounds is determined as a desired sound or an undesired sound based on the determined type of the scenario. The part of the sound processing model 140 for performing the identification processing may be implemented by the computing device 30 through a second creation process. For example, sub-models of the sound processing model 140 for the identification processing are implemented in the second creation process.

In an embodiment, the processing module 14 may use a second trained machine learning model to output a result of identification of each of the one or more sounds. The second trained machine learning model is, for example, a model suitable for sound identification. The second trained machine learning model is obtained by performing second training on a machine learning-based model on the computing device 30. An output of the first trained machine learning model is used as an input in the second training process to generate an output representing that each of the one or more sounds is a desired sound or an undesired sound.

It can be understood that sound features in different scenario types are different, and the second trained machine learning model can use a model suitable for features of each type of sounds to perform the process of identifying this type of sounds. Correspondingly, the computing device 30 uses parameters representing the features of each type of sounds to perform training in the second training process.

Some instances of the sound identification process are described by way of example below.

In block 3061, a cepstrum-related model is used to analyze a cepstrum of audio signals to determine a sound source of each sound, so as to determine the sound as a desired sound or an undesired sound. This analysis method is particularly suitable for analyzing and identifying sound signals with obvious frequency or bandwidth features in a vehicle scenario, such as a vehicle whistle, an intense collision sound, and a buzz of an engine in a cabin.

In block 3062, a voiceprint recognition-related model is used to analyze and identify the audio signals to determine a sound source (such as a sounder) of each sound, so as to determine the sound as a desired sound or an undesired sound. This analysis method is particularly suitable for distinguishing voices of different people. For example, when a scenario type is determined, it is determined whether a person's voice needs to be filtered out as noise or be let through to a person wearing headphones as useful information. For example, such an identification processing method allows a person wearing headphones to hear the discussion sounds of colleagues in a project team to which he/she belongs in an office scenario, while shielding the discussion sounds of colleagues in other project teams.

In this manner, different aspects of acoustic features may be considered as model processing parameters, and these processing parameters may comprise one or more of the following: (1) lexical features (such as a speaker's way of uttering a certain sound); (2) prosodic features (such as the speaker's pitch and energy "pose"); (3) dialects and habits (i.e., words easily repeated by the speaker); and (4) other customized acoustic features.

In block 3063, a speech recognition-related model may be used to perform keyword and/or key sound detection on the audio signals. The keywords and/or key sounds may be some words or sounds for which it is easy to determine a sound source and it is thus determined whether the sounds are filtered out or some words or sounds let through, such as a station broadcast in a railway station, emergency information broadcast in a public facility, and a warning sound of an ambulance.

In block 3064, the communication module 16 receives an instruction from the audio application 20, wherein the instruction indicates a sound processing solution (filtering or letting through) in the determined type of the scenario. The processing module 14 sets the indicated sound as a desired sound or an undesired sound according to the instruction.

In an embodiment, the audio application 20 learns of the determined type of the scenario through the communication module 16, and displays an option menu of each sound source in the type of the scenario on the operation interface of the audio application. The user of the personal sound device 1 can select, on the option menu, sounds to be filtered out and sounds to be let through. An instruction indicating the user's intention to filter sounds is transmitted to the processing module 14 via the communication module 16, and the processing module 14 correspondingly sets the received sounds according to the instruction.

It should be noted that when the sound setting according to the instruction from the audio application 20 conflicts with the sound setting determined by the processing module according to a predetermined analysis and identification strategy, the sound setting according to the instruction is preferably executed, because the instruction can reflect the current intention of the user. For example, when the sound processing model has identified which sounds as the desired sounds and which sounds as the undesired sounds, and filtering configuration is performed based on such identification, the filtering configuration can be adjusted based on an instruction indicating the user's intention to filter sounds.

In block 308, the processing module 14 performs filtering configuration according to the determined desired sounds and undesired sounds to filter the audio signals based on the configuration, so that undesired sounds in the received one or more sounds are at least partially filtered out, and desired sounds in the received one or more sounds are let through. For example, the processing module 14 uses the sound processing model 140 to perform filtering processing in which filtering configuration is performed based on a result of the identification processing, and the audio signals are filtered based on the filtering configuration, so that the undesired sounds are at least partially filtered out, and the desired sounds are let through. The part of the sound processing model 140 for performing the filtering processing may be implemented by the computing device 30 through a third creation process. For example, sub-models of the sound processing model 140 for the filtering processing are implemented in the third creation process. It can be understood that the "filter configuration and filtering based on the filtering configuration" may be implemented by hardware or software or a combination of software and hardware. For example, the way of implementation by hardware may be implemented by means of one or more application specific integrated circuits (ASICs) used as filters.

In an embodiment, the processing module 14 may use a third trained machine learning model to implement the filtering configuration and filtering operations. The third trained machine learning model is obtained by performing third training on a machine learning-based model on the computing device 30. In the third training process, an output of the second trained machine learning model is used as an input to output the filtered audio signals, so that undesired sounds in the one or more sounds are at least partially filtered out, and desired sounds in the one or more sounds are let through.

It can be understood that although a plurality of machine learning-based models are described above, these machine learning-based models can be implemented as one or more hybrid models. For example, the above first trained machine learning model, second trained machine learning model, and third trained machine learning model are combined into one or more hybrid machine learning models. In the process of using training data to train the models, the computing device can train the above machine learning-based models into one or more hybrid machine learning models.

In block 310, the filtered audio signals are output, so that the user of the personal sound device 1 hears the sound that is intelligently filtered and matches his/her own intention.

Figure 4:
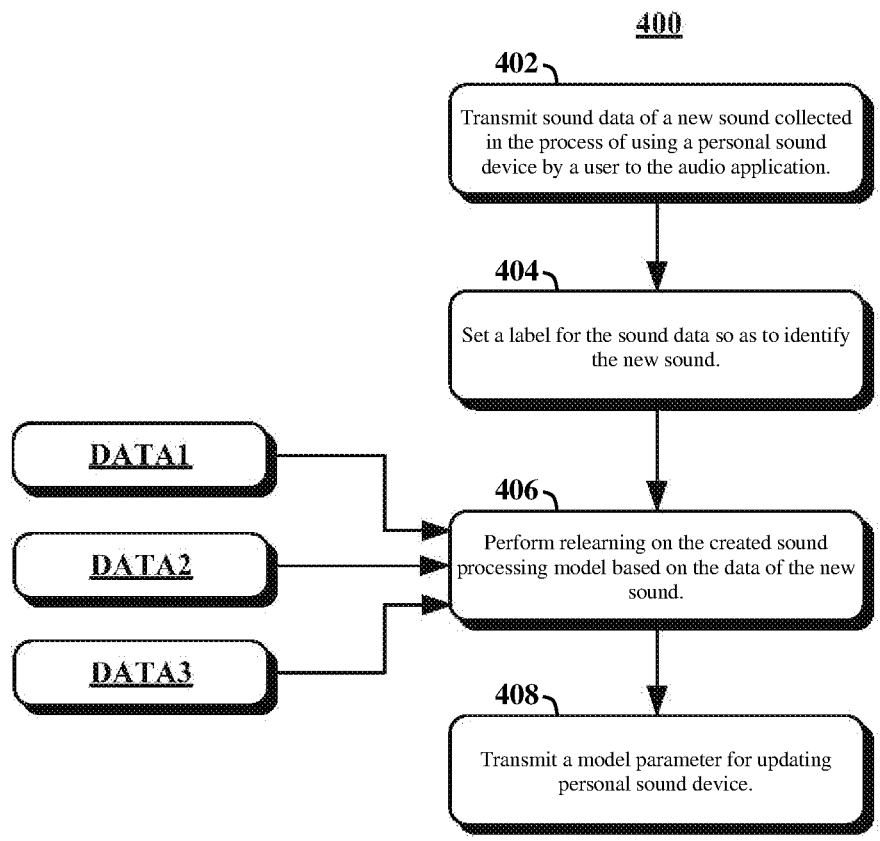
FIG. 4 shows an exemplary process of sound relearning according to a feasible implementation of the disclosure.

FIG. 4 shows an exemplary process 400 of sound relearning according to a feasible implementation of the disclosure. The following takes the process 400 of performing sound relearning by the sound processing system 100 as an example for description.

In block 402, the sound processing apparatus 10 transmits sound data (an audio signal) of a new sound collected in the process of using a personal sound device 1 by a user to the audio application 20 via the communication module 16. The new sound is, for example, a sound that a current user of the personal sound device is interested in or thinks that it needs to be included in an identification range, and the sound has not been included in any ambient type of sound before, i.e., it is not included in any large type or small type of sounds.

It can be understood that the transmitted sound data may comprise sound data from different users during use, such as sound data DATA1 from USER1, sound data DATA2 from USER2, and sound data DATA3 from USER3.

In block 404, the user uses the audio application 20 to set a label for the sound data so as to identify the new sound. The label is, for example, the voice of friend A, the voice of colleague B, or the voice of customer C. Then, the audio application 20 transmits the data of the new sound having the label to the computing device 30 on the remote server 3.

In block 406, at the remote server 3, after receiving the data of the new sound, the computing device 30 performs relearning on the created sound processing model based on the data of the new sound, such that the sound processing model can identify the new sound as a desired sound or an undesired sound, and generate a processing parameter for enabling the sound processing model to identify the new sound.

In an embodiment, the computing device 30 retrains a machine learning-based model by using the data of the received new sound as a training sample. For example, the computing device 30 retrains the second trained machine learning model. In the retraining process, the data of the new sound is used as a model input to generate, as a model output, a type represented by a label of the data. Through such retraining, a model parameter (a processing parameter) for updating the second trained machine learning model can be generated, i.e., the second trained machine learning model located in the processing module 14 can identify, by importing the model parameter (the processing parameter), the new sound as a desired sound or an undesired sound.

It can be understood that the data of the new sound used for retraining may come from a plurality of users of the personal sound device 1, and therefore, customized combinations of sound filtering and letting through suitable for different users' respective intentions can be customized for the users.

In block 408, the computing device 30 transmits, to the audio application 20, a model parameter for updating, and then the audio application 20 pushes the model parameter to the sound processing apparatus 10 of the personal sound device 1, such that the sound processing apparatus 10 can identify a new sound. Therefore, the sound processing apparatus 10 has a function of improving sound identification capabilities.

Figure 5:
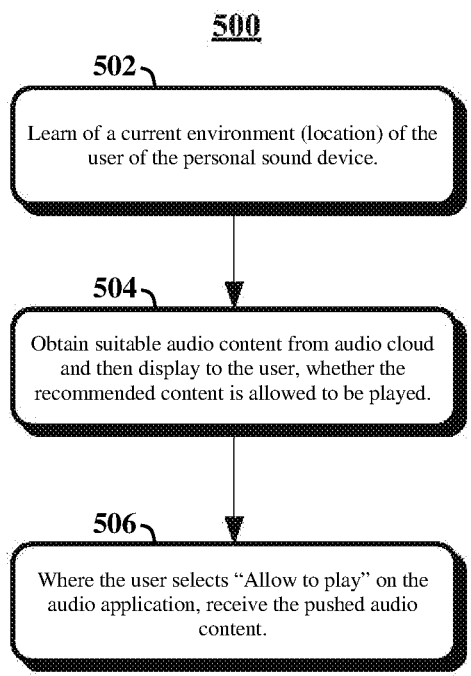
FIG. 5 shows an exemplary process of audio push according to a feasible implementation of the disclosure.

FIG. 5 shows an exemplary process 500 of audio push according to a feasible implementation of the disclosure. The following takes the process 500 of performing audio push by the sound processing system 100 as an example for description.

In block 502, the audio application 20 learns of a current environment (location) of the user of the personal sound device 1 through the sound processing apparatus 10 and/or its own positioning system. Moreover, the audio application 20 can learn whether the user is currently in a speech event (call).

In block 504, in the case where the user is not in a speech event, the audio application 20 may obtain suitable audio content from audio cloud 4 (shown in FIG. 1), and then display, on an interface of the audio application 20 to the user, whether the recommended content is allowed to be played.

In block 506, in the case where the user selects "Allow to play" on the interface of the audio application 20, the sound processing apparatus 10 receives the pushed audio content from the audio application 20 through the communication module, such as music, comic talks, and fairy tales suitable for the current scenario.

In an embodiment, the external electronic device 2 is communicatively connected to the audio cloud 4 (such as NetEase cloud music). In the case where the user's environment is determined and it is determined that the user is not in a speech event, the audio application 20 obtains suitable audio content from the audio cloud 4, and then displays, on an interface of the audio application 20 to the user, whether to play the recommended content; and if the user selects "Yes", the pushed audio content can be played to the user.

Figure 6:
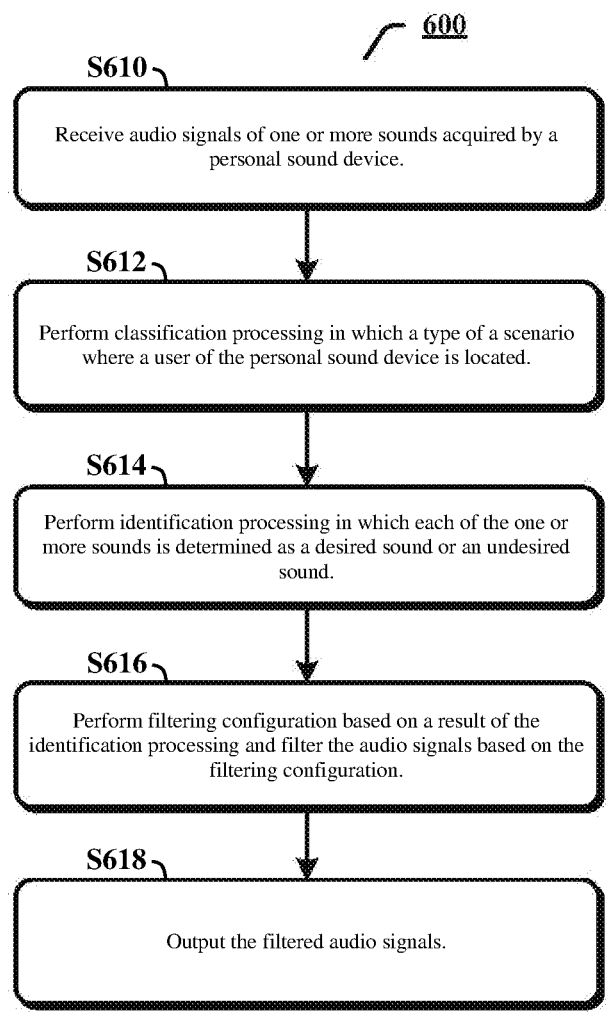
FIG. 6 is a flow chart of a sound processing method according to a feasible implementation of the disclosure.

FIG. 6 shows a sound processing method 600 according to an implementation of the disclosure. The sound processing method 600 may be performed by the above sound processing apparatus 10, or may be performed by the above sound processing system 100. Therefore, the above related descriptions are also applicable thereto.

In step S610, audio signals of one or more sounds acquired by a personal sound device are received, wherein the one or more sounds comprise at least ambient sounds around the personal sound device.

In step S612, a sound processing model is used to perform classification processing in which a type of a scenario where a user of the personal sound device is located is determined based on the audio signals.

In step S614, the sound processing model is used to perform identification processing in which each of the one or more sounds is determined as a desired sound or an undesired sound based on the determined type of the scenario.

In step S616, the sound processing model is used to perform filtering processing in which filtering configuration is performed based on a result of the identification processing, and the audio signals are filtered based on the filtering configuration, so that undesired sounds in the one or more sounds are at least partially filtered out, and desired sounds in the one or more sounds are let through.

In step S618, the filtered audio signals are output, so as to provide same to the user.

Figure 7:
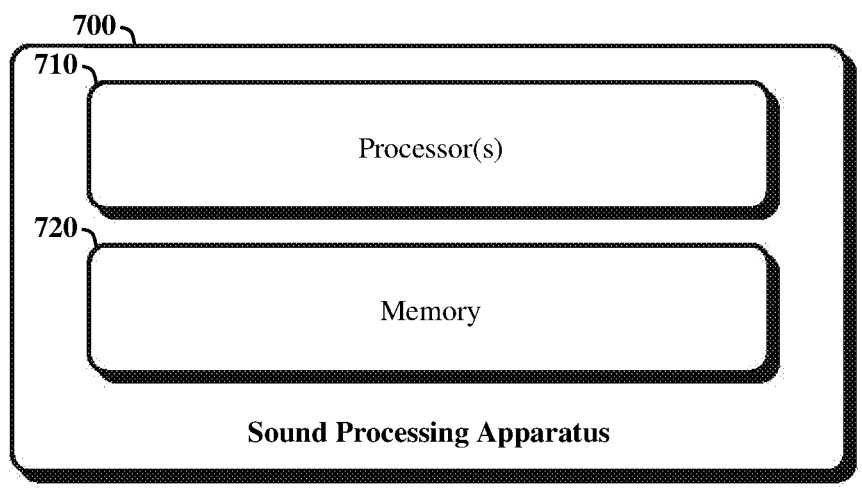
FIG. 7 is a schematic block diagram of another sound processing apparatus according to the disclosure.

FIG. 7 shows another exemplary sound processing apparatus 700 used in the personal sound device 10 according to the disclosure. The apparatus 700 may comprise one or more processors 710 and a memory 720 storing computer-executable instructions, wherein when the computer-executable instructions are executed, the one or more processors 710 may perform the above method 600.

The disclosure further provides a computer-readable storage medium. The computer-readable storage medium may comprise instructions that, when executed, cause one or more processors to perform operations for intelligent sound processing according to the embodiments of the present disclosure as described above, such as the above method 600.

It can be seen that, according to the technical solution of the disclosure, the artificial intelligence technology can be used to automatically process sounds received by the personal sound device, so that a user can hear the sounds matching a scenario type and his/her own intention.

Moreover, according to the technical solution of the disclosure, there is no need to set up, in the personal sound device, a local database containing a large amount of sample sound data, because a large number of sample sounds are correspondingly classified, identified and matched in the remote server as training data.

Moreover, according to the technical solution of the disclosure, combined solutions of sound filtering and letting through can be customized for different scenario types and different users, without the need to perform setting for sounds one by one during each use.

Moreover, according to the technical solution of the disclosure, a machine learning model that is good at classifying, identifying and filtering sound data is used to process sound data, which can quickly and fully dig out different features and/or dependencies of various types of sound data, thereby improving the efficiency and accuracy of sound data processing.

It should be understood that all the modules in the above apparatus can be implemented in various ways. These modules may be implemented as hardware, software, or a combination thereof. In addition, any of these modules can be further divided into sub-modules or combined together in terms of function.

Processors have been described with reference to various apparatuses and methods. These processors can be implemented using electronic hardware, computer software, or any combination thereof. Whether these processors are implemented as hardware or software may depend on a specific application and overall design constraints imposed on the system. As an example, the processor, any part of the processor, or any combination of processors provided in the disclosure can be implemented as a microprocessor, a microcontroller, a digital signal processor (DSP), a field programmable gate array (FPGA), a programmable logic device (PLD), a state machine, a gate logic, a discrete hardware circuit, and other suitable processing components configured to perform the various functions described in the present disclosure. Functions of the processor, any part of the processor, or any combination of the processors provided in the disclosure can be implemented as software executed by a microprocessor, a microcontroller, a DSP, or other suitable platforms.

The software should be broadly regarded as representing instructions, instruction sets, codes, code segments, program codes, programs, subprograms, software modules, applications, software applications, software packages, routines, subroutines, objects, running threads, processes, functions, etc. The software can reside in a computer-readable medium. The computer-readable medium may comprise, for example, a memory, and the memory may be, for example, a magnetic storage device (such as a hard disk, a floppy disk, and a magnetic stripe), a compact disk, a smart card, a flash memory device, a random access memory (RAM), a read-only memory (ROM), a programmable ROM (PROM), an erasable PROM (EPROM), an electrically erasable PROM (EEPROM), a register or a removable disk. Although the memory is shown to be separate from the processor in the various aspects presented in the present disclosure, the memory may also be located inside the processor (such as a cache or a register).

Although some implementations have been described above, these implementations are presented only as examples and are not intended to limit the scope of the disclosure. The appended claims and equivalent replacements thereof are intended to cover all modifications, substitutions and changes made within the scope and subject matter of the disclosure.

What is claimed is:

1. A sound processing apparatus used in a personal sound device, the sound processing apparatus comprising:
    a receiver configured to receive audio signals of one or more sounds acquired by the personal sound device, wherein the one or more sounds comprise at least ambient sounds around the personal sound device;
    a processor configured to use a sound processing model to:
        determine a scenario type that classifies where a user of the personal sound device is located based on the audio signals;
        identify each of the one or more sounds as a desired sound or an undesired sound based on the determined scenario type; and
        perform a filtering configuration and filter the audio signals based on the filtering configuration, so that undesired sounds in the one or more sounds are at least partially filtered out, and desired sounds in the one or more sounds are let through;
    an output module configured to output the filtered audio signals to the user; and
    a communication module configured to be communicatively connected to an external electronic device located outside the personal sound device, so as to exchange information with an audio application of the external electronic device,
    wherein the communication module is further configured to (i) transmit an audio signal of a new sound captured by the personal sound device during use to the audio application and (ii) receive a processing parameter, of the audio signal, based on the new sound from the audio application, so that the new sound can be identified.

2. The sound processing apparatus as claimed in claim 1, wherein the sound processing model comprises one or more machine learning-based models.

3. The sound processing apparatus as claimed in claim 1, wherein the sound processing model comprises:
    a first trained machine learning model;
    a second trained machine learning model; and
    a third trained machine learning model,
    wherein the processor is further configured to:
        use the first trained machine learning model to determine the scenario type;
        use the second trained machine learning model to identify, based on the output of the first trained machine learning model, each of the one or more sounds as a desired sound or an undesired sound; and
        use the third trained machine learning model to filter the audio signals, based on the output of the second trained machine learning model, and to output the filtered audio signals.

4. The sound processing apparatus as claimed in claim 3, wherein the first trained machine learning model, the second trained machine learning model, and the third trained machine learning model are combined into one or more hybrid machine learning models.

5. The sound processing apparatus as claimed in claim 1, wherein:
    the processor is configured to determine each sound as a desired sound or an undesired sound using at least one model configured for at least one of: cepstrum analysis, voiceprint recognition, and keyword and/or key sound detection.

6. The sound processing apparatus as claimed in claim 1, wherein:
    the communication module receives an instruction from the audio application, and
    the instruction comprises the user's intention to filter sounds in the determined type of the scenario; and
    the processor is configured to adjust the filtering configuration according to the instruction.

7. The sound processing apparatus as claimed in claim 1, wherein:
    the communication module is further configured to receive recommended audio content from the audio application, and
    the recommended audio content is based on the determined type of the scenario and a use state of the personal sound device.

8. The sound processing apparatus as claimed in claim 1, wherein at least one of the receiver, the processor, and the output module are implemented by one or more artificial intelligence (AI) chips.

9. A method of creating a sound processing model with a computing device, the computing device arranged in a server and the sound processing model for processing audio signals of one or more sounds acquired during use of a personal sound device, the server being remote from the personal sound device, the method comprising:
    training, with the computing device, the sound processing model to determine, based on the audio signals, a scenario type that classifies where a user of the personal sound device is located, the training including performing first training on a machine learning-based model to obtain a first trained machine learning model, and using the audio signals as an input in the first training process to generate an output representing the scenario type;
    training, with the computing device, the sound processing model to identify each of the one or more sounds as a desired sound or an undesired sound based on the determined scenario type, the training including performing second training on a machine learning-based model to obtain a second trained machine learning model, and using an output of the first trained machine learning model as an input in the second training process to generate an output representing that each of the one or more sounds is the desired sound or the undesired sound;
    training, with the computing device, the sound processing model to perform filtering configuration and to filter the audio signals based on the filtering configuration, so that undesired sounds in the one or more sounds are at least partially filtered out, and desired sounds in the one or more sounds are let through, the training including performing third training on a machine learning-based model to obtain a third trained machine learning model, and using an output of the second trained machine learning model as an input in the third training process to output the filtered audio signals; and performing, with the computing device, a relearning process on the sound processing model based on an audio signal of a new sound captured by the personal sound device during use, such that the sound processing model can identify the new sound as the desired sound or the undesired sound, and generate a processing parameter for enabling the sound processing model to identify the new sound.

10. The method as claimed in claim 9, wherein the first trained machine learning model, the second trained machine learning model, and the third trained machine learning model are combined into one or more hybrid machine learning models.

11. The method as claimed in claim 9, further comprising:
retraining the second trained machine learning model in a retraining process;
using, in the retraining process, the audio signal of the new sound captured by the personal sound device during use as an input, to generate an output representing that the new sound is the desired sound or the undesired sound; and
generating, in the retraining process, a processing parameter for enabling the second trained machine learning model to identify the new sound.

12. The method as claimed in claim 9, the performing the relearning process further comprising:
performing the relearning process on the sound processing model based on a plurality of audio signals of the new sound captured by a plurality of users of a plurality of personal sound devices.

13. The method as claimed in claim 9, the performing the relearning process further comprising:
receiving a label for the new sound from the personal sound device, the label having been selected by the user of the personal sound device.

14. The method as claimed in claim 9, the performing the relearning process further comprising:
generating the processing parameter by training the sound processing model using the audio signal of the new sound as a training input and a label for the new sound as a training output.

15. A sound processing system, comprising:
a sound processing apparatus arranged in a personal sound device, the sound processing apparatus comprising:
a receiver configured to receive audio signals of one or more sounds acquired by the personal sound device, wherein the one or more sounds comprise at least ambient sounds around the personal sound device;
a processor configured to use a sound processing model to:
determine a scenario type that classifies where a user of the personal sound device is located based on the audio signals;
identify each of the one or more sounds is as a desired sound or an undesired sound based on the determined scenario type; and
perform a filtering configuration and filter the audio signals based on the filtering configuration, so that undesired sounds in the one or more sounds are at least partially filtered out, and desired sounds in the one or more sounds are let through; and
an output module configured to output the filtered audio signals to the user; and
a computing device arranged in a server that is remote from the personal sound device and configured to create the sound processing model by
training the sound processing model to determine, based on the audio signals, a scenario type that classifies where a user of the personal sound device is located;
training the sound processing model to identify each of the one or more sounds as a desired sound or an undesired sound based on the determined scenario type; and
training the sound processing model to perform filtering configuration and to filter the audio signals based on the filtering configuration, so that undesired sounds in the one or more sounds are at least partially filtered out, and desired sounds in the one or more sounds are let through; and
an audio application arranged in an external electronic device outside the personal sound device, the audio application separately communicatively connected to the computing device and the sound processing apparatus.

16. The sound processing system as claimed in claim 15, further comprising:
one or more processors; and
a memory storing computer-executable instructions that, when executed, cause the one or more processors to create the sound processing model.

17. The sound processing system as claimed in claim 16, wherein the computer-executable instructions are stored on a computer-readable storage medium.

* * * * *

UNITED STATES PATENT AND TRADEMARK OFFICE
CERTIFICATE OF CORRECTION

| | |
|---|---|
| PATENT NO. | : 11,610,574 B2 |
| APPLICATION NO. | : 17/234086 |
| DATED | : March 21, 2023 |
| INVENTOR(S) | : Xie et al. |

It is certified that error appears in the above-identified patent and that said Letters Patent is hereby corrected as shown below:

In the Claims

In Claim 1, Column 16, Lines 8-9: "sounds is as a desired sound" should read --sounds as a desired sound--.

Signed and Sealed this
Twentieth Day of June, 2023

Katherine Kelly Vidal
*Director of the United States Patent and Trademark Office*